(12) United States Patent  (10) Patent No.: US 8,909,472 B2
Tornkvist et al.  (45) Date of Patent: Dec. 9, 2014

(54) RATE DISCOUNT FORECASTS FOR WIRELESS USER TERMINALS

(75) Inventors: Robert Tornkvist, Karlshamn (SE); Elias Blomqvist, Karlskrona (SE); Geert Claassen, Nattraby (SE); Ulf Eriksson, Karlskrona (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 362 days.

(21) Appl. No.: 12/976,103

(22) Filed: Dec. 22, 2010

(65) Prior Publication Data

US 2012/0166079 A1  Jun. 28, 2012

(51) Int. Cl.
*H04M 11/00* (2006.01)
*H04L 12/14* (2006.01)
*H04M 15/00* (2006.01)
*G06Q 30/02* (2012.01)
*H04W 4/24* (2009.01)

(52) U.S. Cl.
CPC ....... *H04L 12/1496* (2013.01); *H04M 15/8083* (2013.01); *H04M 15/835* (2013.01); *H04M 15/80* (2013.01); *G06Q 30/0241* (2013.01); *H04W 4/24* (2013.01); *H04M 15/83* (2013.01); *G06Q 30/0202* (2013.01); *H04M 15/85* (2013.01); *G06Q 30/0261* (2013.01); *H04M 15/84* (2013.01)
USPC ...... 701/516; 455/405; 379/114.06; 379/128; 705/400

(58) Field of Classification Search
USPC .............. 701/208; 455/406, 407, 408, 456.1, 455/405, 41.2, 566; 379/114.06, 128; 705/400
See application file for complete search history.

(56) References Cited

U.S. PATENT DOCUMENTS

2004/0122684 A1\* 6/2004 Kaikuranta ....................... 705/1
2004/0246920 A1  12/2004 Savolainen
2008/0274715 A1\* 11/2008 Heit et al. .................... 455/406

FOREIGN PATENT DOCUMENTS

| EP | 1372331 A2 | 12/2003 |
|---|---|---|
| EP | 1988699 A1 | 11/2008 |
| GB | 2399429 A1 | 9/2004 |
| WO | WO 9821907 A2 | 5/1998 |
| WO | WO 0143463 A1 | 6/2001 |
| WO | WO 2009063136 A1 | 5/2009 |

OTHER PUBLICATIONS

International Search Report, PCT/SE2011/051248, Apr. 18, 2012.
Written Opinion of the International Searching Authority, PCT/SE2011/051248, Apr. 18, 2012.
International Preliminary Report on Patentability, PCT/SE2011/051248, Jan. 21, 2013.

\* cited by examiner

*Primary Examiner* — Adam Tissot
(74) *Attorney, Agent, or Firm* — Myers Bigel Sibley & Sajovec, P.A.

(57) ABSTRACT

A user interface of a wireless user terminal provides a forecast of a future rate discount that may apply at a future time and/or at a possible future location of the wireless user terminal. The forecast may be displayed as a map and/or as textual or graphical information, and may be provided in response to a user request, in response to receipt of a message from the wireless network and/or automatically at a given time. Related systems, methods and devices are described.

20 Claims, 17 Drawing Sheets

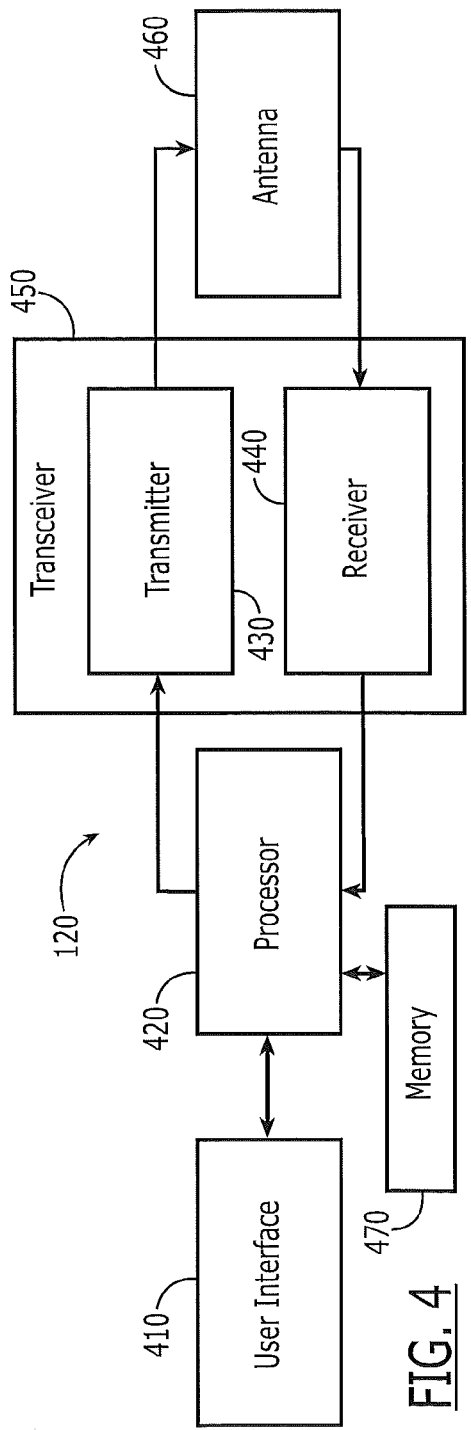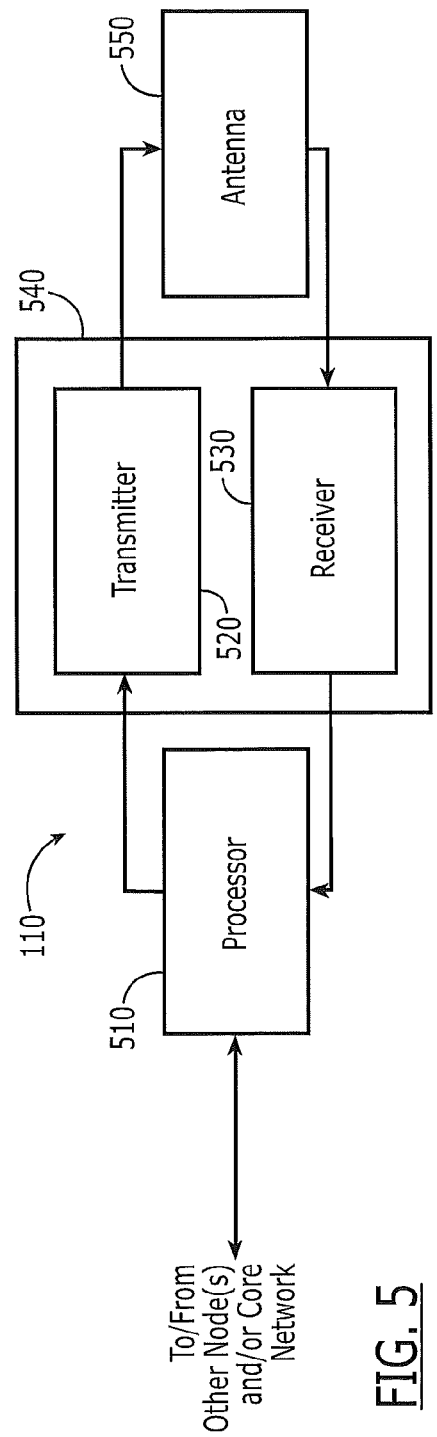

Discount status: 12:08, valid to 13:00
Current location: Gullberna park

Current discount: High
Trend (+1H): No change

City: Karlskrona

Down town discount: Low
Down town trend (+1H): Falling discount

Surrounding status, current time (+0H, -1km radius)

North: Decrease of discount
North East: High decrease of discount
East: Same discount level
South East: Same discount level
South: Same discount level
South West: Slow decrease of discount
West: Decrease of discount
North West: Decrease of discount

Discount status: 12:08, valid to 13:00
Current location: Gullberna park

Current discount: High
Trend (+1H): No change

City: Karlskrona

Down town discount: Low
Down town trend (+1H): Falling discount

Surrounding status, current time (+0H, -1km radius)

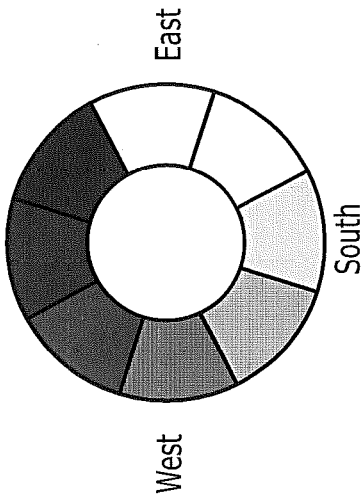

FIG. 12

RATE DISCOUNT FORECASTS FOR WIRELESS USER TERMINALS

BACKGROUND

Various embodiments described herein relate to radio frequency communications and, more particularly, to wireless communication networks and devices, and methods of operating same.

Wireless communication networks are increasingly being used for wireless communication with various types of wireless user terminals. The wireless network itself may include a plurality of space-apart nodes that define a plurality of cells, and a core network that controls the nodes and interfaces the nodes with other wired and/or wireless networks. The nodes may be terrestrial and/or space-based. The nodes communicate with the wireless user terminals using radio resources that are allocated to the wireless network. The radio resources may be defined in terms of time (for example, in a Time Division Multiple Access (TDMA) system), frequency (for example, in a Frequency Division Multiple Access (FDMA) system) and/or code (for example, in a Code Division Multiple Access (CDMA) system). Radio resources may be assigned to wireless user terminals by the wireless network upon initial communication and may be reassigned due to, for example, movement of the wireless user terminals, changing bandwidth requirements, changing network traffic, etc.

Wireless network operators have employed dynamic pricing or dynamic discounts to manage revenue and radio resources in the network by offering rate discounts depending on the location of a wireless user terminal and/or the present time in which the wireless terminal is communicating. Dynamic pricing/discounts can attempt to change subscriber call patterns, so as to decrease traffic on the wireless network at peak times and/or to increase network traffic during quiet times. Subscriber call patterns may also be changed so as to decrease traffic in geographic areas of high congestion, and/or to increase network traffic in those areas that have less congestion. Network operators can thereby achieve more efficient utilization of the network capacity, and subscribers can save money.

Accordingly, network operators may employ dynamic pricing/discount offerings, where the price/discount is dependent on the utilization of the network. The subscriber may be made aware of the present discount by providing on the display of the wireless user terminal an indication of a discount percentage. This discount percentage may change due to factors such as location, time and/or duration of network interaction. This percentage may be displayed, for example, on a second line of a wireless user terminal display beneath the network operator indication.

Another revenue management solution that is used by network operators is referred to as "Home Zone" or "Location Based Charging", where a different price or discount is given when the wireless user terminal is located within a preregistered area or Home Zone.

In a 2G network, the discount information may be provided from the wireless network to the user wireless terminals using a cell broadcast functionality, such as a broadcast channel in GSM systems. In 3G networks that do not generally have a broadcast channel, discount information may be obtained from the wireless network in response to sending an Unstructured Supplementary Service Data (USSD) message from the wireless user terminal to the wireless network.

SUMMARY

Various embodiments described herein provide rate discount forecasts that indicate future rate discounts for future communications with a wireless network. Accordingly, network revenue and/or traffic management may be obtained by providing to a wireless user terminal a forecast of a future rate discount for future communications with the wireless network. Present communications may be altered in anticipation of a rate discount for future communications at a future time and/or at a future location. The future rate discount for future communications with the wireless network is different from a present rate discount for a present communication with the wireless network.

Wireless user terminals according to various embodiments described herein include a transceiver that is configured to communicate with the wireless network, a user interface and a processor. The processor is configured to provide to the user interface a forecast of a future rate discount for future communications with the wireless network. In some embodiments, the forecast of a future rate discount comprises an indication of a future time and a future rate discount that will apply at the future time. In other embodiments, the forecast of a future rate discount comprises an indication of a rate discount at a possible future location that is geographically spaced apart from the present location of the wireless user terminal. Still other embodiments can combine forecasts of both future location and future time. For example, in some embodiments, the forecast of a future rate discount comprises an indication of a rate discount at a possible future location that is geographically spaced apart from a present location of the wireless user terminal and indication of a future time at which the rate discount would apply. In other embodiments, an indication of a future time at which the wireless user terminal is expected to reach the future location at which the rate discount will apply also may be provided.

The forecast of a future rate discount for wireless communications with the wireless network may be displayed on the user interface. In some embodiments, the forecast of a future rate discount comprises a map that is displayed on the display and that includes thereon an indication of a present location of the wireless terminal and an indication of a region in which a future rate discount will apply at a future time. In other embodiments, the map includes thereon an indication of a present location of the wireless user terminal and an indication of a region that is geographically spaced apart from the present location of the wireless user terminal and in which a rate discount applies. In still other embodiments, the map includes thereon an indication of a present location of the wireless user terminal, an indication of a region that is geographically spaced apart from the present location of the wireless user terminal and in which a rate discount applies, and an indication of a future time at which the rate discount will apply.

Yet other forecast indications may be provided according to yet other embodiments. For example, indications of rate discounts at a plurality of directions in which the wireless user terminal can move may be provided. Other embodiments can provide indications of rate discounts at a plurality of future times at a present location of the wireless user terminal. These embodiments may also be combined.

The processor may be configured to provide a forecast of a future rate discount in response to receipt of a request from the user interface, in response to receipt of a message from the wireless network and/or automatically at a given time. The processor may be further configured to send a message to the wireless network over the transceiver in response to the receipt of the request from the user interface and/or to receive the message from the wireless network over the transceiver, using unstructured supplementary service data, short message service and/or hypertext transfer protocol. Moreover, the processor may be further configured to adjust operation of the transceiver in response to the forecast of a future rate discount for future communications with the wireless network that is provided to the user interface, and in further response to receipt of a user command at the user interface. For example, in some embodiments, in response to the user command, the wireless user terminal may cease present communications or may decrease the bandwidth and/or quality of service that is used for present communications, in response to the forecast of the future rate discount for future communications.

Various other embodiments described herein may provide a node of a wireless network. The node may include a processor and a transceiver that is configured to communicate with a wireless user terminal. The processor is configured to provide to the wireless user terminal via the transceiver, a forecast of a future rate discount for future communications with the wireless network. As was described above, in some embodiments, the forecast of a future rate discount comprises an indication of a future time and a future rate discount that will apply at the future time. In other embodiments, the forecast of a future rate discount comprises an indication of a rate discount at a possible future location that is geographically spaced apart from the present location of the wireless user terminal. Still other embodiments can combine forecasts of both future location and future time. For example, in some embodiments, the forecast of a future rate discount comprises an indication of a rate discount at a possible future location that is geographically spaced apart from a present location of the wireless user terminal and indication of a future time at which the rate discount would apply. In other embodiments, an indication of a future time at which the wireless user terminal is expected to reach the future location at which the rate discount will apply also may be provided. The forecast may be provided in response to receipt of a request from a wireless user terminal and/or automatically at a given time. Moreover, the forecast may be provided as textual, graphical, animation and/or geolocation data, including a map.

Analogous wireless communication methods also may be provided according to various embodiments described herein. For example, some methods may comprise wirelessly transmitting from a node of a wireless network to a wireless user terminal a forecast of a future rate discount for future communications between the wireless user terminal and the wireless network. The forecast of a future rate discount may comprise an indication of a future time and a future rate discount that will apply and/or an indication of a possible future location and a future rate discount that will apply. The wireless transmitting of the forecast of a future rate discount may be performed in response to receipt of a request from the wireless user terminal and/or automatically at a given time. Moreover, the forecast may be provided as textual, graphical, animation and/or geolocation data, including a map. Accordingly, network and/or terminal management solutions may be based on forecasts of a future rate discount, according to various embodiments described herein.

BRIEF DESCRIPTION OF THE DRAWINGS

FIG. 4 is a block diagram illustrating a wireless user terminal, such as the wireless user terminal 120 of FIG. 1, according to various embodiments described herein.

FIG. 5 is a block diagram illustrating a node, such as the node 110 of FIG. 1, according to various embodiments described herein.

FIGS. 9-27 illustrate example displays that may be used to provide forecasted rate discount information according to various embodiments described herein.

DETAILED DESCRIPTION

Figure 1:
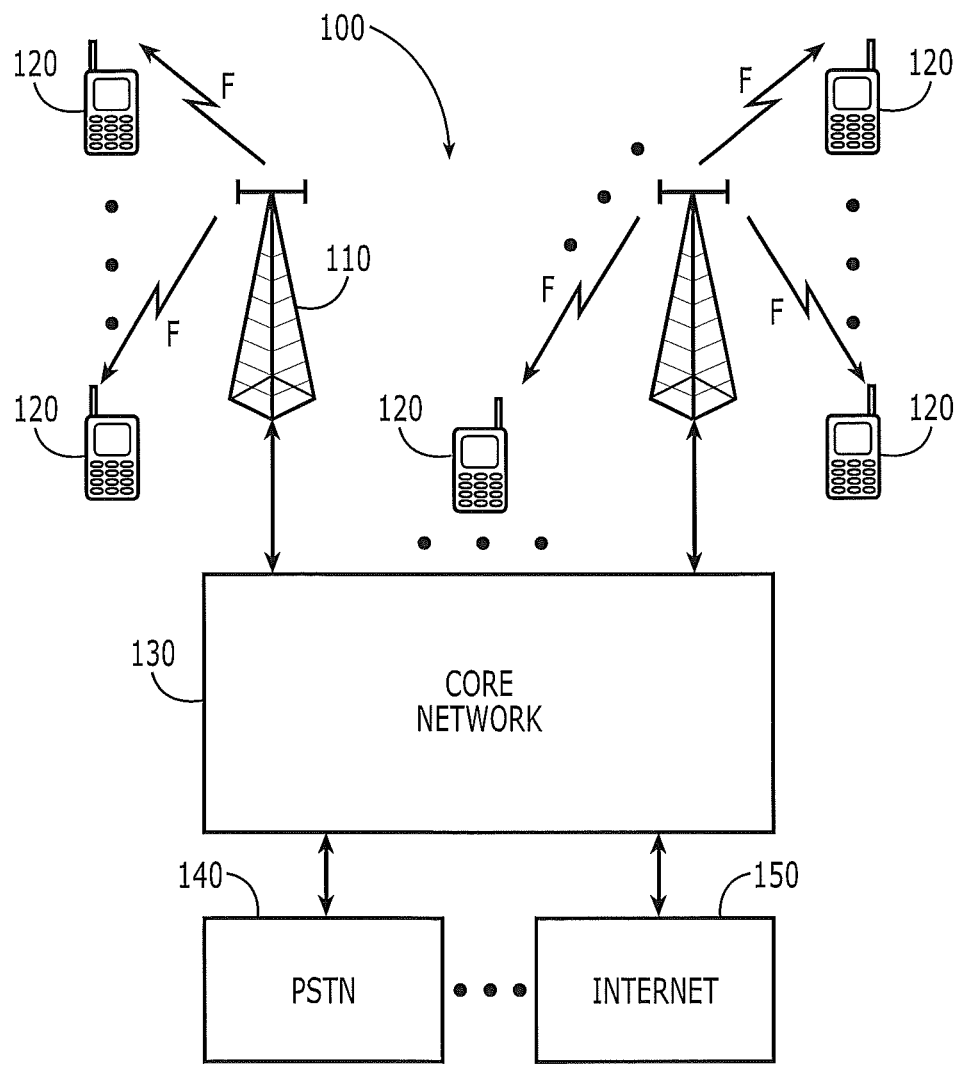
FIG. 1 is a block diagram of methods, systems, nodes and/or wireless user terminals that can provide and/or use forecasted rate discount information according to various embodiments described herein.

FIG. 1 is a block diagram of methods, systems, nodes and/or wireless user terminals that can provide and/or use forecasted rate discount information according to various embodiments described herein. Referring now to FIG. 1, a wireless communications network or system 100 may include a plurality of nodes 110 that wirelessly communicate with a plurality of wireless user terminals 120 according to various embodiments described herein. The nodes communicate with a core network 130, which itself may be configured to communicate with other communication networks, such as the Public Switched Telephone Network(s) (PSTN) 140, the Internet 150, etc. The functionalities of the core network 130 and/or the node(s) 110 may be provided at a single site separate from nodes 110, distributed across different sites separate from nodes 110, distributed among the nodes 110, distributed among the nodes 110 and one or more sites separate from the nodes 110, etc. A node 110 itself may also be centralized at a single site or distributed among multiple sites.

As also shown in FIG. 1, the nodes 110 provide the wireless user terminals 120 with a forecast F of a future rate discount for future communications with the wireless network. This forecast F may be provided from the node 110 to the wireless user terminals 120 using various techniques that will be described below. Moreover, various other information may accompany the forecast, as will be described in various embodiments below. In general, the node 110 includes a transceiver that is configured to communicate with a wireless user terminal 120 and a processor that is configured to provide to the wireless terminal 120 via the transceiver, the forecast of a future rate discount for future communications with the wireless network 100. Similarly, the wireless user terminal 120 may also include a transceiver that is configured to communicate with the node 110, a user interface and a processor. The processor is configured to provide to the user interface a forecast of a future rate discount for future communications with the wireless network.

It will be understood that, although the nodes 110 provide the wireless user terminals 120 with the forecast F of the future rate discount, the forecast is typically determined by a wireless network element other than the node and then passed to the node for transmission to the wireless user terminals. For example, the forecast may be determined by the core network 130 and/or by one or more other servers that are connected to the core network 130, for example using the PSTN 140 and/or the Internet 150.

The forecast of a future rate discount for future communications with the wireless network that is obtained by the wireless user terminal from the node may comprise an indication of a future time and a future rate discount that will apply at the future time and/or an indication of a rate discount at a possible future location that is geographically spaced apart from the present location of the wireless user terminal. Moreover, the forecast of a future rate discount may be presented to the user interface of a wireless user terminal in a range of presentations from the relatively simple to the relatively complex. An example of a relatively simple forecast may be a message that is provided from the node to the wireless terminal that states "Rate decrease by 50% at 5 PM". In these embodiments, the processor of the wireless user terminal 120 may provide the user interface with the forecast of a future rate discount without extensive additional processing, so that the user interface may, for example, display this message on the second line of the display beneath the network operator name.

In other embodiments, more complex forecasts of a future rate discount may be provided by the node to the wireless user terminal. For example, a range of times and discounts may be provided. In other embodiments, a range of locations and their associated discounts may be provided. Combinations of times and locations may also be provided. Other data may also be provided by the node to the wireless terminal. For example, a map may be provided that includes thereon an indication of a present location of the wireless user terminal, and an indication of a region that is geographically spaced apart from the present location of the wireless user terminal and in which a rate discount applies. In still other embodiments, a map may be provided that includes thereon an indication of the present location of the wireless user terminal, a present direction of movement of the wireless terminal and an indication of a region that is geographically spaced apart from the present location of the wireless terminal in the present direction of movement of the wireless terminal, and in which a rate discount applies at a time when the wireless terminal is expected to reach a region. The node 110 may provide the wireless user terminal with the forecast in the form of textual, graphical, animation and/or geolocation data, including a map. Many detailed examples will be provided below.

In still other embodiments, relatively simple or relatively complex forecasts of future rate discounts may be provided from the node 110 to the wireless user terminal 120, and the processor of the wireless user terminal 120 may process this forecast information and additional data to provide an indication to the user interface of the wireless terminal 120. For example, in some embodiments, the node 110 may only provide the wireless terminal 120 an indication of a time and a rate discount, and the processor of the wireless user terminal may formulate a message to be displayed or enunciated at the user interface of the wireless terminal. In other embodiments, a schedule of future rate discounts by geographical area and/or by time may be provided from the node to the wireless user terminal, and the processor may configure this information, along with other information that is generated at the wireless user terminal regarding the present position and/or velocity thereof, to provide textual, graphical, animation and/or geolocation data that is displayed on the display. In some embodiments, a map may include thereon an indication of a present location of the wireless user terminal and an indication of a region that is geographically spaced apart from the present location of the wireless user terminal and in which a rate discount applies. In other embodiments, the map may include thereon an indication of a present location of the wireless user terminal, a present direction of movement of the wireless terminal and an indication of a region that is geographically spaced apart from the present location of the wireless user terminal in the present direction of movement of the wireless terminal and in which a rate discount applies at a time when the wireless terminal is expected to reach the region.

Accordingly, a wide range of forecast information may be provided from the node 110 to the wireless user terminal 120, and a wide range of additional data may be provided by the node and/or by the wireless user terminal to present the forecast of a future rate discount. Many examples will be provided below.

Figure 2:
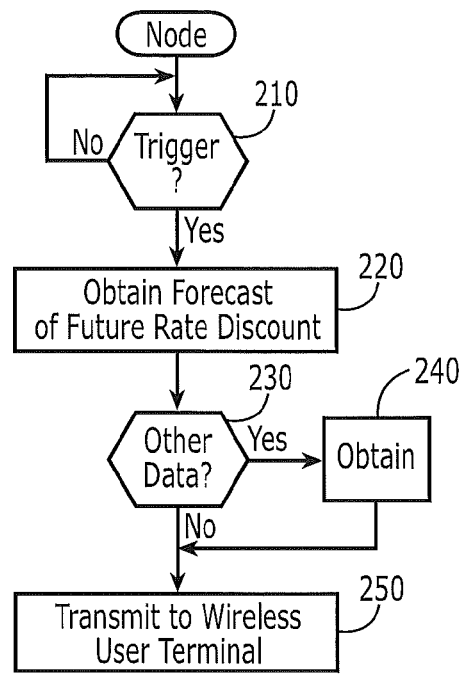
FIG. 2 is a flowchart of operations that may be performed by a node, such as a node 110 of FIG. 1, to provide forecasted rate discount information to wireless user terminals, such as wireless user terminals 120 of FIG. 1, according to various embodiments described herein.

FIG. 2 is a flowchart of operations that may be performed by a node, such as a node 110 of FIG. 1, to provide forecasted rate discount information to wireless user terminals, such as wireless user terminals 120 of FIG. 1, according to various embodiments described herein. Referring to FIG. 2, a triggering event or trigger occurs at Block 210. The triggering event may be receipt of a request from the wireless user terminal for a forecast of a future rate discount, such as by activating a forecast application ("app") on the wireless user terminal. The trigger may be receipt of a message from the wireless network. The trigger may also be an automatic trigger, such as a given time of day, a given amount of network traffic, etc. Combinations and subcombinations of these and/or other triggers may be provided.

Still referring to FIG. 2, at Block 220, a forecast of a future rate discount is obtained. The forecast may be obtained by accessing rate information tables or other databases of rate information that may be stored at the node 110 and/or at the core network 130. The rate data may be processed to obtain a forecast for a given wireless user terminal that may be dependent upon the location, movement, subscription package and/or other parameters that apply to the given wireless user terminal. Alternatively, parameters for a set of wireless terminals may also be obtained and used for the given wireless terminal.

Still referring to FIG. 2 at Block 230, other data may be combined with the forecast of a future rate discount. For example, other data may be obtained at Block 240 that may include a location of a given wireless user terminal, an indication of its direction of travel or velocity, past usage patterns, etc. In some embodiments, the other data may also be combined with the forecast information to provide a graphical user interface that is transmitted to the wireless user terminal 120. In still other embodiments, the data itself may be transmitted, but the graphical user interface may be generated at the wireless user terminal 120.

Finally, referring to Block 250, the forecast of a future rate discount that was obtained at Block 220, along with other data that obtained at Block 240, is transmitted to the wireless terminal 120 using the transceiver of the node 110.

Figure 3:
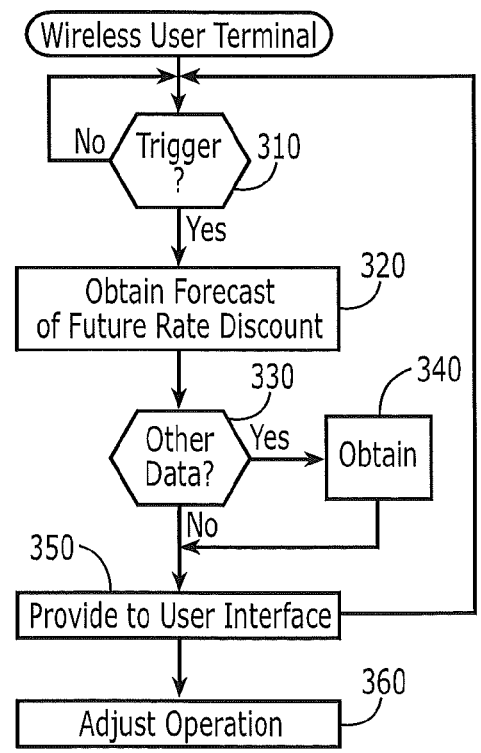
FIG. 3 is a flowchart of operations that may be performed by a wireless user terminal, such as the wireless user terminal 120 of FIG. 1, to provide forecasted rate discount indication according to various embodiments described herein.

FIG. 3 is a flowchart of operations that may be performed by a wireless user terminal, such as the wireless user terminal 120 of FIG. 1, to provide forecasted rate discount indication according to various embodiments described herein. Referring to FIG. 3, these operations may be performed in response to a triggering event at Block 310. The triggering event may be receipt of a request from the user interface, receipt of a message from the wireless network and/or automatically at a given time, network traffic, etc., as was described above for Block 210. Then, at Block 320, a forecast of future rate discount is obtained. The forecast may be obtained from the node 110 via the transceiver of the wireless user terminal, and/or may be obtained from the memory of the wireless user terminal 120 if already stored at the wireless user terminal.

At Block 330, a determination is made as to whether other data is to be used. If so, this other data is obtained at Block 340. For example, the other data may include geolocation information, such as GPS data and/or other information to identify a position, direction of movement and/or velocity of the wireless user terminal, a mapping function, such as Google Maps™ to obtain a map surrounding the location, etc. The future rate discount and the other data, if obtained at Block 340, is provided to the user interface at Block 350, for example as a display, as a text message, as a text-to-speech message, an alarm and/or using any other user interface presentation technique.

Referring to Block 360, in some embodiments, the processor of the wireless user terminal may be further configured to adjust operation of the wireless user terminal, such as operation of the transceiver in response to the forecast of a future rate discount and in further response to receipt of a user command at the user interface. Thus, present communications may be altered by the user and/or automatically altered by the wireless user terminal in anticipation of a rate discount for future communications at a future time and/or at a future location. For example, in some embodiments, in response to the user command, the wireless user terminal may cease present communications or may decrease the bandwidth and/or quality of service that is used for the present communications in response to the forecast of the future rate discount for future communications. In other embodiments, these operations may be performed automatically by the wireless user terminal without the need for user intervention.

FIG. 4 is a block diagram illustrating a wireless user terminal, such as the wireless user terminal 120 of FIG. 1, according to various embodiments described herein. As shown, the wireless user terminal may include a processor 420, a transmitter 430, a receiver 440, an antenna 460 and a user interface 410. The transmitter 430 and receiver 440 may be at least partially combined in a transceiver 450. The antenna 460 may include one or more antennas that communicate with the transceiver 450 through one or more antenna ports. The processor 420 may process voice/data communications transmitted through the transmitter 430 and antenna 460 and received through the antenna 460 and receiver 440. The processor 420 may also be configured to provide to the user interface 410 a forecast of a future rate discount for future communications with the wireless network according to any of the embodiments described herein. The forecast may be generated by the wireless user terminal 120, may be generated in part by the wireless user terminal 120 and in part by the node 110 and/or core network 130, or may be generated entirely by the node 110 and/or core network 130. The data and/or results of the forecast may be communicated to the processor 420, in which case the processor 420 may be configured to configure the user interface to present the forecast to a user. The user interface 410 may include one or more speakers, microphones, keypads, displays, touch-sensitive displays, etc., to support radiotelephone voice communication, Internet browsing, text messaging, email, etc. The receiver 440 and the antenna 460 may be further configured to receive GPS and/or other positioning signals, and the processor 420 may be configured to process these positioning signals and/or to transmit these signals through the transmitter 430 and antenna 460 to the node 110. Instructions and/or data that are used by the processor 420 may be stored in one or more memories 470.

FIG. 5 is a block diagram illustrating a node, such as the node 110 of FIG. 1, according to various embodiments described herein. As shown, node 110 may include a processor 510, a transmitter 520, a receiver 530 and an antenna 550. The transmitter and receiver may be at least partially combined in a transceiver 540. The antenna 550 may include one or more antennas that communicate with the transceiver 540 through one or more antenna ports. The processor 510 may be coupled to the core network 130 and/or to other nodes 110. The processor 510 may be configured to provide to the wireless user terminal 120 via the transceiver 540, the forecast of a future rate discount for future communications with the wireless network according to any or all of the embodiments described herein. As was described herein, rate discount forecasts may be determined by the node 520, by the core network 130 and/or by the wireless user terminal 120.

Figure 6:
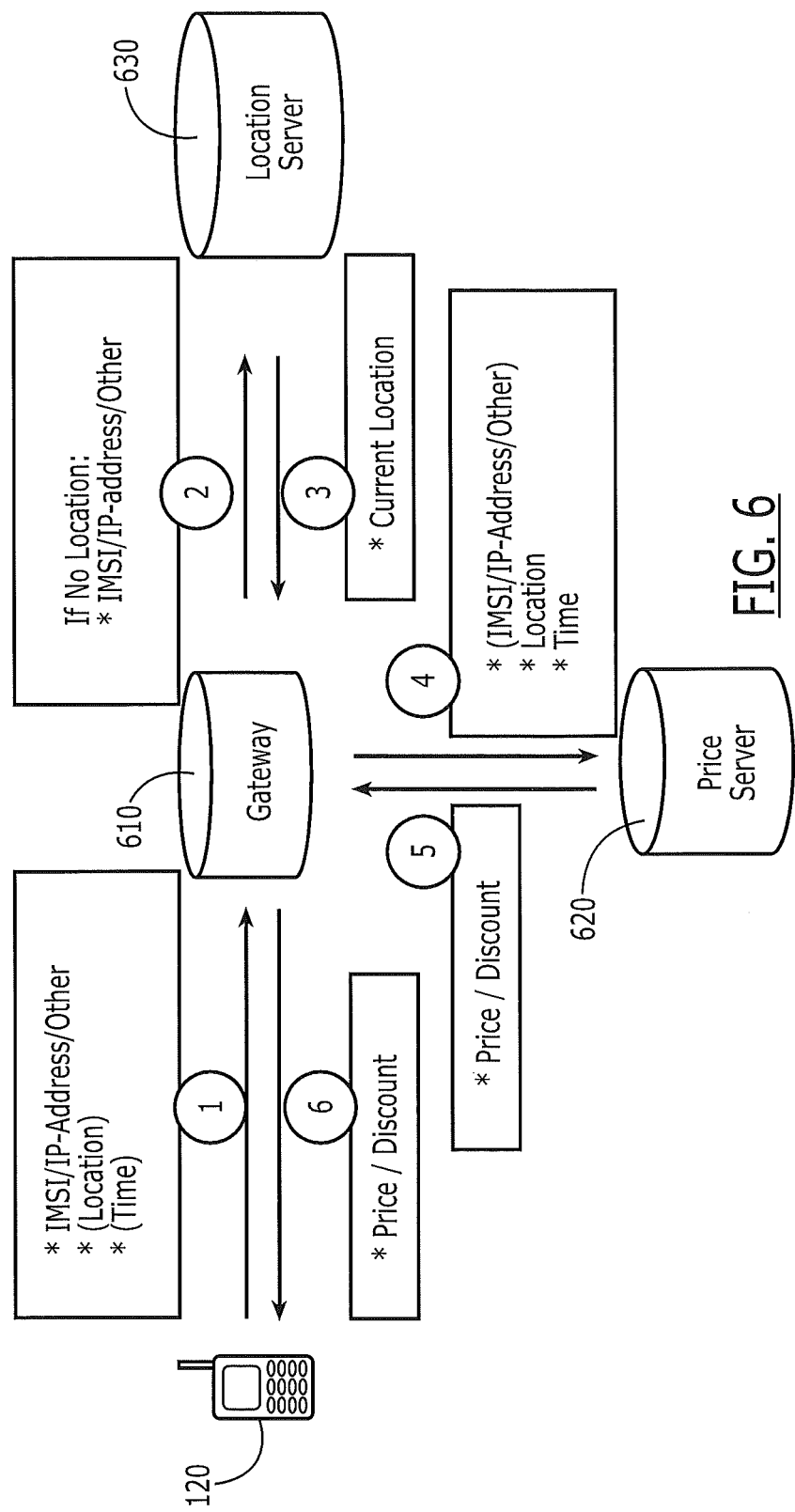
FIG. 6 is a block diagram of methods, systems, nodes and/or wireless user terminals that can provide and/or use forecasted rate discount indication according to various other embodiments described herein.
Figure 7:
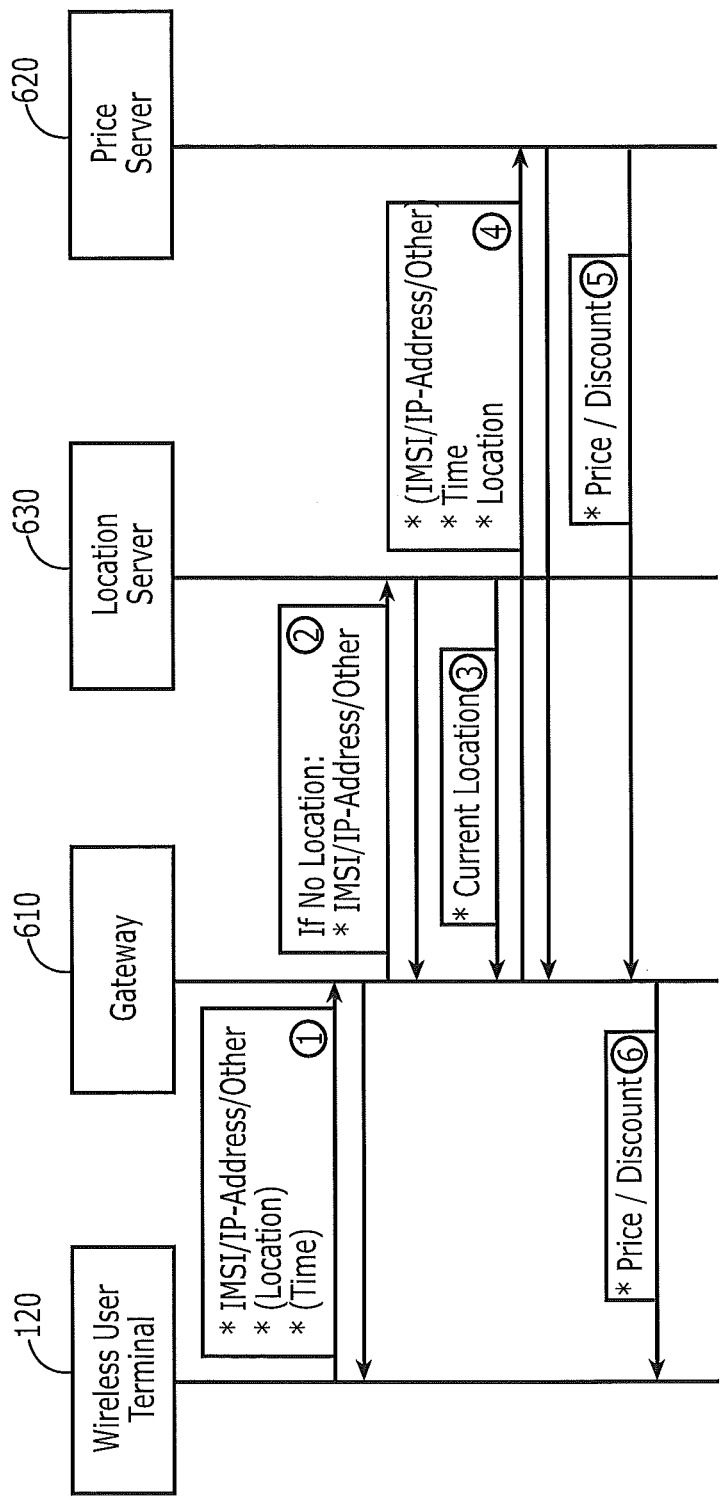
FIG. 7 is a signaling diagram of methods; systems, nodes and/or wireless user terminals of FIG. 6 that can provide and/or use forecasted rate discount indication according to various embodiments described herein.
Figure 8:
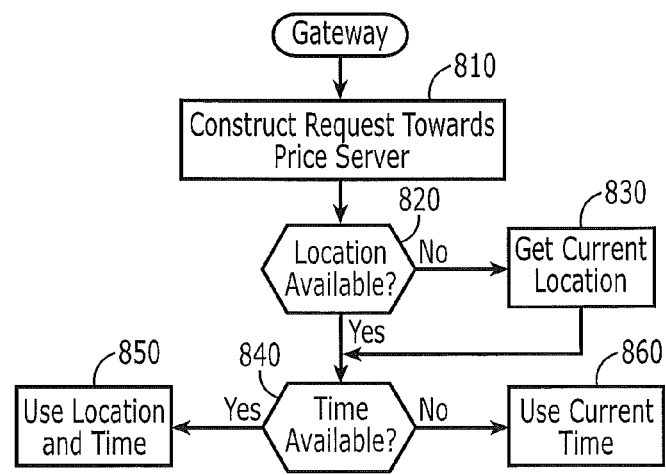
FIG. 8 is a flowchart of operations that may be performed by a gateway, such as the gateway 610 of FIG. 6 or 7, according to various embodiments described herein.

FIG. 6 is a block diagram of an architecture that may be used to provide rate discount forecasts for wireless user terminals according to various embodiments described herein. FIG. 7 is a signaling diagram of message flows among the blocks of FIG. 6. FIG. 8 is a flowchart of operations that may be performed by a gateway 610 of FIG. 6 or 7, according to various embodiments described herein.

Embodiments of FIGS. 6, 7 and 8 may apply to 3G networks. 3G networks may lack the cell broadcast support in wireless user terminals. Accordingly, a cell broadcast may not be employed as a notification channel for pricing and discount information. In addition, mobile broadband using a computer on 3G networks may also not be able to use cell broadcast as a viable option. Accordingly, in 3G networks and when not using a conventional smartphone, for example using a mobile broadband-enabled computer, there may be no simple way, like cell broadcast, to obtain updated prices or discounts.

Various embodiments that will now be described in connection with FIGS. 6-8 can open up an interface from the wireless user terminal (whether it is a smartphone, a mobile broadband-enabled computer or any other wireless user terminal) towards a gateway using, for example, Unstructured Supplementary Service Data/Short Message Service/Hypertext Transfer Protocol (USSD/SMS/HTTP), which makes lookups towards a server which can keep the time, location, subscriber and price information, as well as nearby location information. The information is returned to the wireless user terminal to be presented in the form of, for example, a map with different areas shown with discount percentages displayed. The time aspect can be shown by enabling time stepping in the presentation layer and/or some other indication of future discounts in the same and/or different locations. The interface may be open to both automatic and manual interrogations.

FIGS. 6 and 7 illustrate an architecture and signaling diagram between a wireless user terminal 120 and a gateway 610, a price server 620 and a location server 630. The gateway 610, the price server 620 and/or location server 630 may be located in the node 110, in the core network 130 and/or attached to any other network that communicates with the core network 130, such as the Internet 150. The gateway 610, price server 620 and location server 630 may comprises one or more enterprise, application, personal, pervasive and/or embedded computer systems that may be standalone and/or interconnected by a public and/or private, wired and/or wireless, real and/or virtual network including the Internet.

Referring now to FIGS. 6 and 7, a lookup is initiated from the wireless user terminal 120 by sending a message towards the gateway 610 through USSD/SMS/HTTP, as shown at ① in FIGS. 6 and 7. The message contains a unique identifier for the wireless user terminal, such as an International Mobile Subscriber Identity (IMSI), an Internet Protocol (IP) address or some other uniquely identifying parameter. As also shown in ①, location and time may optionally be included.

Still referring to FIGS. 6 and 7, the gateway 610 has logic that checks if the location has been part of the initial request. If not, it makes a lookup towards a Home Location Register (HLR) and/or other location database in a location server 630, which contains updated location information, as shown at ②. The location can be identified by a Cell Global Identity (CGI), Service Area Identity (SAT), Location Number, geographical position (longitude and latitude), street address and/or other user-defined identifying identifiers, such as "home", "work", etc.

The location server 630 uses the unique identifier shown at ② to make the lookup towards the HLR and/or other database to retrieve the updated location information and provides a current location to the gateway 610 as shown at ③.

Dependent on whether the request towards the gateway 610 from the wireless user terminal 120 included a time parameter or not, the lookup by the gateway 610 towards the price server 620 will either use the current time or the time used in the lookup towards the gateway 610, as shown at ④. In response to the price server 620, the current or forecasted price is returned, as shown at ⑤. The gateway 610 then processes the price/discount information that is received from the price server, may add other data as was described extensively above, and provide the same to the wireless user terminal 120 as indicated at ⑥.

Referring again to ④ of FIGS. 6 and 7, the price lookups can be sent as multiple requests in one single command. This may be used to facilitate the retrieval of all current and/or forecasted prices in nearby locations, or forecasting for several time periods in advance for the current and/or another location. Accordingly, the end user can have a way of knowing the current price in either the current location or another location. The end user can also get updated forecast price(s) in either the location where it is currently or in other location(s). This can provide a very effective inducement to make end users change their behavior.

FIG. 8 is a flowchart of operations that may be performed by a gateway, such as the gateway 610 of FIGS. 6 and 7. Referring to FIG. 8, at Block 810, the gateway constructs a request towards the price server 620, as was shown in ④ above. If the location is available at Block 820 and the time is available at Block 840, then the location and time are used to address the price server at Block 850. Alternatively, if the location is not available at Block 820, then the current location is obtained at Block 830 from the location server 630, as shown in ② and ③ in FIGS. 6 and 7. Moreover, if the time is not available at Block 840, the current time can be used in addressing the price server 620, as shown at Block 860 and ④ of FIGS. 6 and 7.

Many examples of user interfaces will now be illustrated and described according to various embodiments described herein. These user interfaces are illustrative and shall not be construed as limiting.

Figure 9:
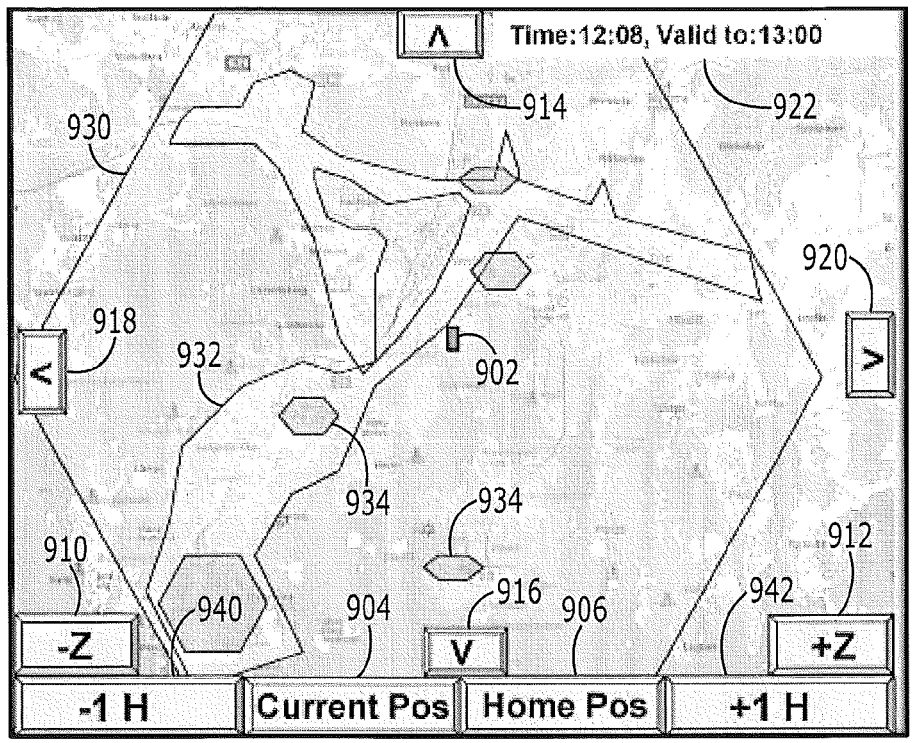

FIG. 9 is an illustration of an example display on a wireless user terminal according to various embodiments described herein. As shown, the display may include a map with an indication 902 of the wireless user terminal's current position or home position based on activation of a "Current Pos" button 904 or a "Home Pos" button 906. The map may be zoomed in or zoomed out by activating zoom buttons 910 or 912. Moreover, the map may be moved in any of four directions by activating an up, down, left or right directional button 914, 916, 918 or 920, respectively. A time display 922 indicates a current time and a time for which the future rate discounts will apply. Alternatively, zooming and/or moving may be made with finger gestures on a touch screen, such as dragging, pulling, pushing, stretching, etc.

Still referring to FIG. 9, the map may include a first contour 930 that indicates the area over which the forecast system applies, and which may generally indicate a default high discount area unless indicated otherwise. A second contour 932 within the first contour indicates an area with some discount, and further contours 934 indicate areas with little or no discount. The various contours may be indicated by shading, as shown in the black and white rendition of FIG. 9, by different colors, and/or using other techniques. Moreover, the contours may be changed to reflect the prior discounts one hour earlier or the forecasted discounts one hour in the future, by activating the −1H or +1H buttons 940 or 942, respectively.

Accordingly, FIG. 9 illustrates embodiments wherein the forecast of a future rate discount comprises a map that is displayed on the display of the user interface, and that includes thereon an indication of a present location of the wireless user terminal and an indication of a region that is geographically spaced apart from the present location of the wireless user terminal and in which a rate discount applies. Moreover, FIG. 9 also illustrates embodiments that also include an indication of a future time at which the rate discount will apply.

Figure 10:
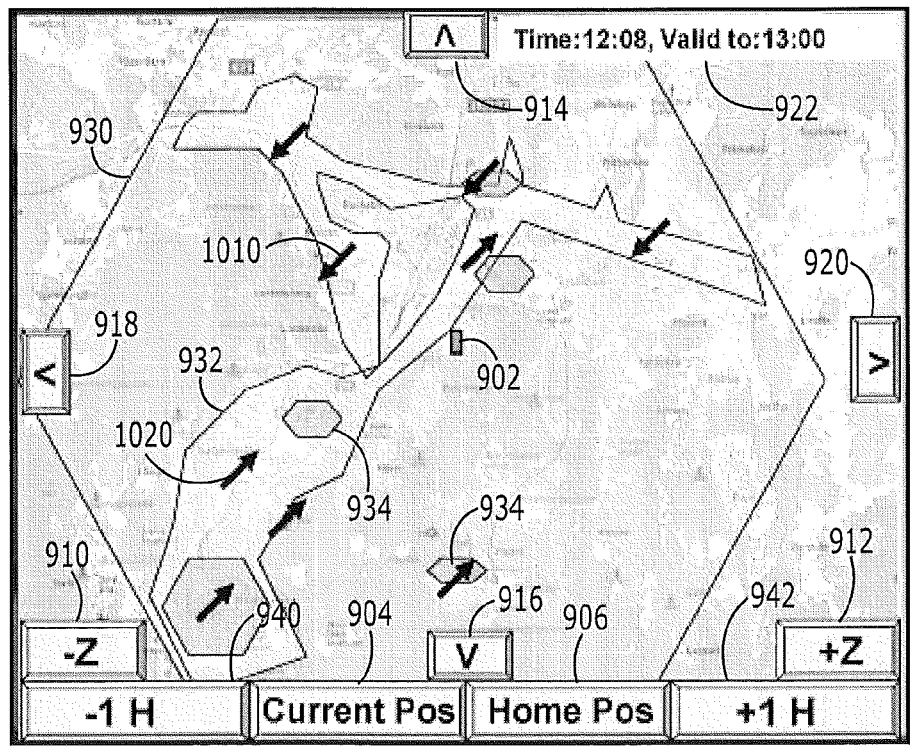

FIG. 10 illustrates another display that is similar to that of FIG. 9, but that also includes arrows that indicate the expected cost trend. Up arrows 1020 indicate increased cost, whereas down arrows 1010 indicate decreased costs. The costs may be valid for areas that are near the arrow. Accordingly, FIG. 10 also illustrates embodiments that provide an indication of future rate discounts that will apply at future times.

FIG. 11 illustrates a textual display of discounts rather than a graphical display, such as a map. As shown in FIG. 10, locations and trends may be displayed. Moreover, the lower portion shows the discount when moving from the current position. Accordingly, embodiments of FIG. 11 can provide indications of rate discounts at a plurality of directions in which a wireless user terminal can move.

Figure 13:
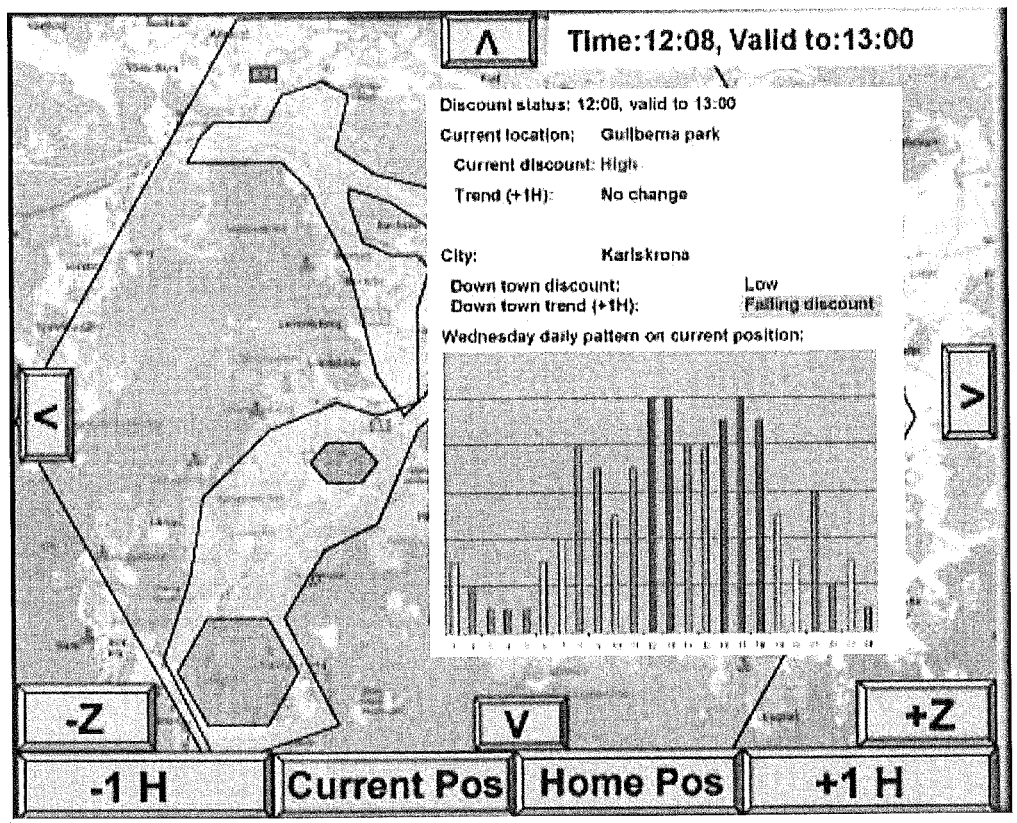

FIG. 12 illustrates a combined text and graphical view, with the graph being a chart illustrating direction, wherein a color or shading indicates an amount of a forecasted discount. FIG. 13 illustrates other embodiments, wherein the graph at the lower portion of the display shows a predicted 24 hour discount view for the current position. The height, color and/or shading of the bars can indicate an amount of a discount. Accordingly, embodiments of FIG. 13 can provide indications of rate discounts at a plurality of future times at a present location of the wireless user terminal.

Figure 14:
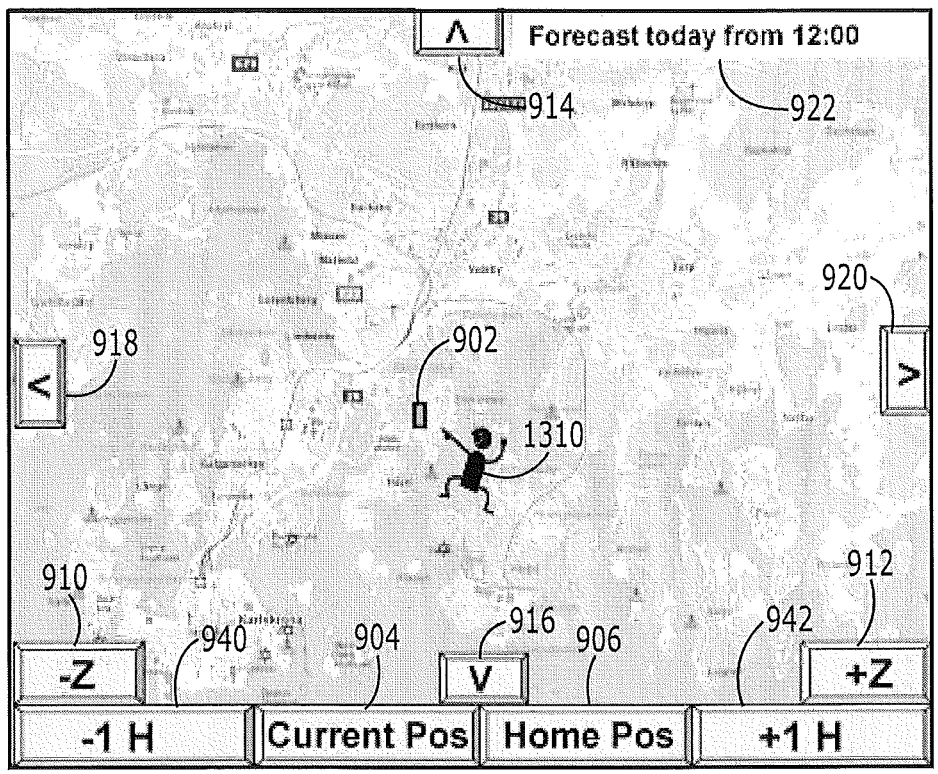

FIG. 14 illustrates other embodiments wherein animation may be provided. Specifically, a cursor 1310 may be moved by the user to various geographic areas and a text, voice and/or other indication of a present discount at that area may be provided. Alternatively, an animated figure such as illustrated by the cursor 1310 can move around as a "weather man", pointing to various regions and "speaking" the associated information.

Figure 15:
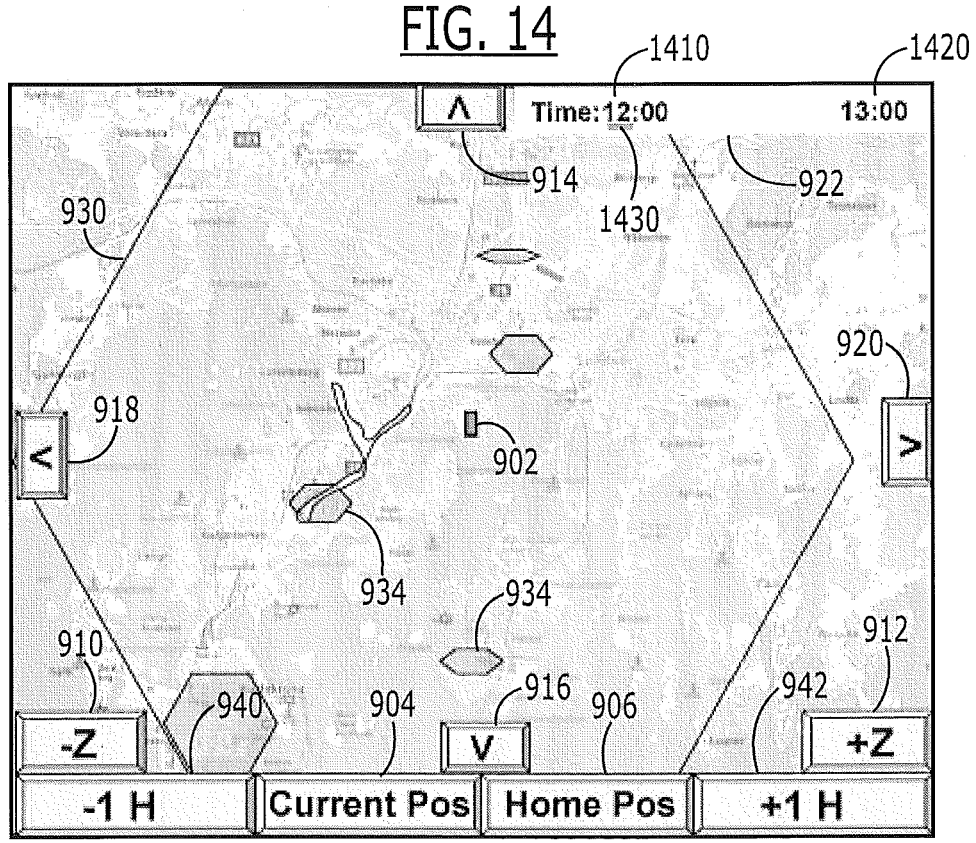

FIG. 15 illustrates another example of animation wherein the contours 930, 932, 934 change over a time period from a current time 1410 to a final time 1420. A slider 1430 can indicate the movement of time and may be manipulated by the user or move automatically. This embodiment may be analogized to elapsed time animation on weather forecasting maps.

Figure 16:
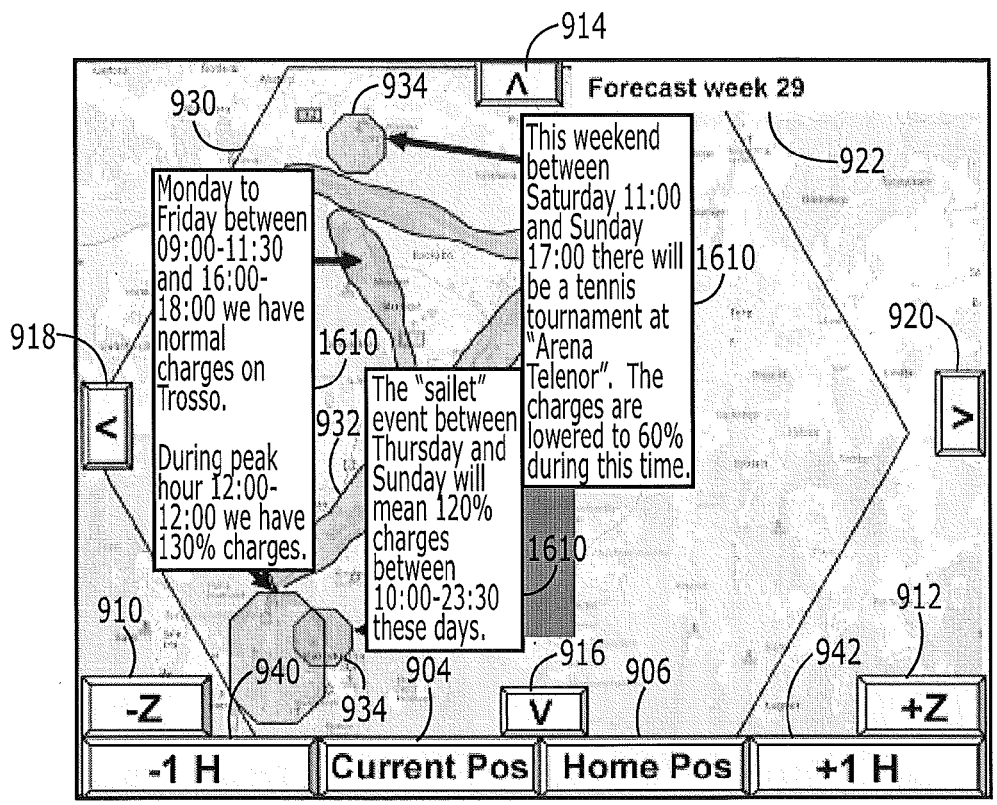

FIG. 16 illustrates the addition of text blocks to elaborate on the discounts for various areas. The text blocks 1610 may all be displayed, may be displayed in sequence or may be displayed up on moving a cursor over a given geographic area. The text blocks can provide a one week trend, as well as an indication of "hot spots".

Figure 17:
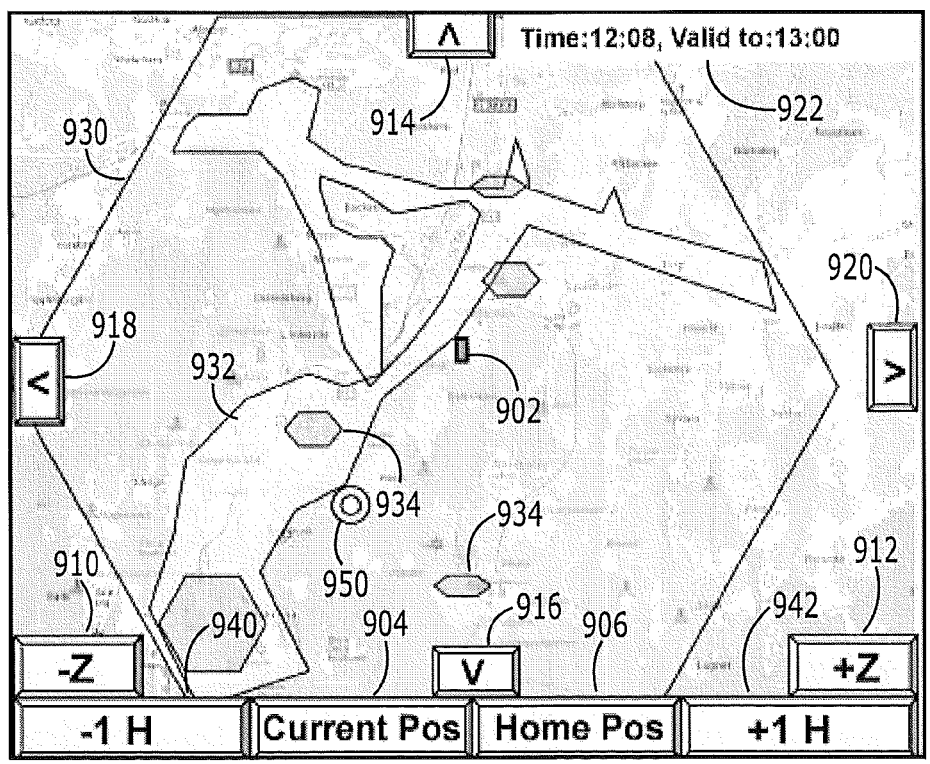
Figure 18:
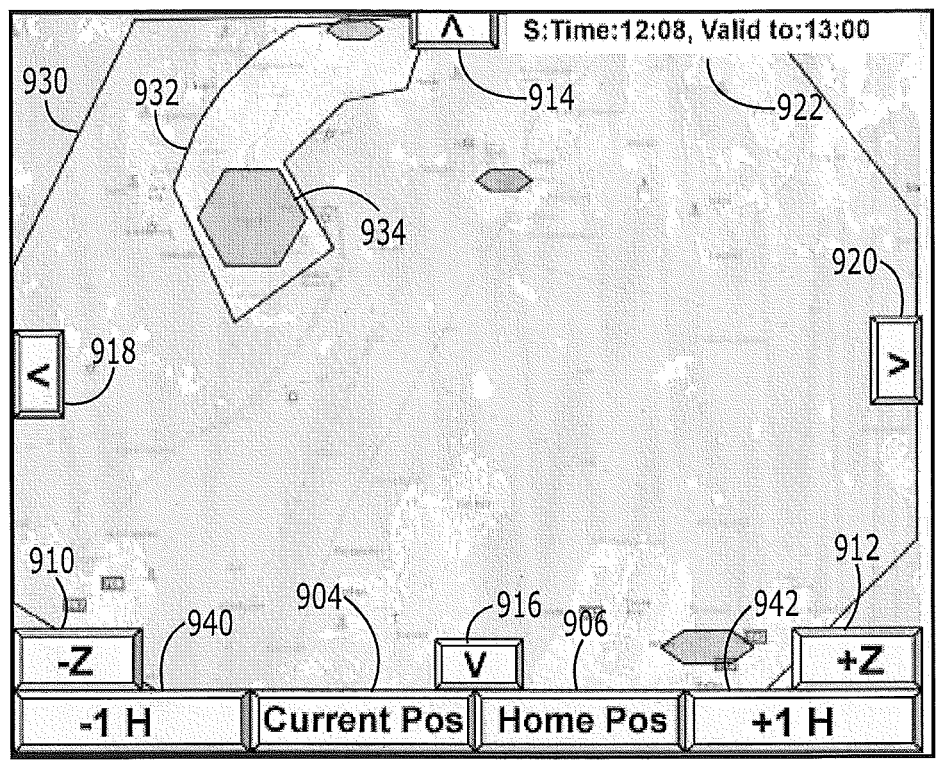
Figure 19:
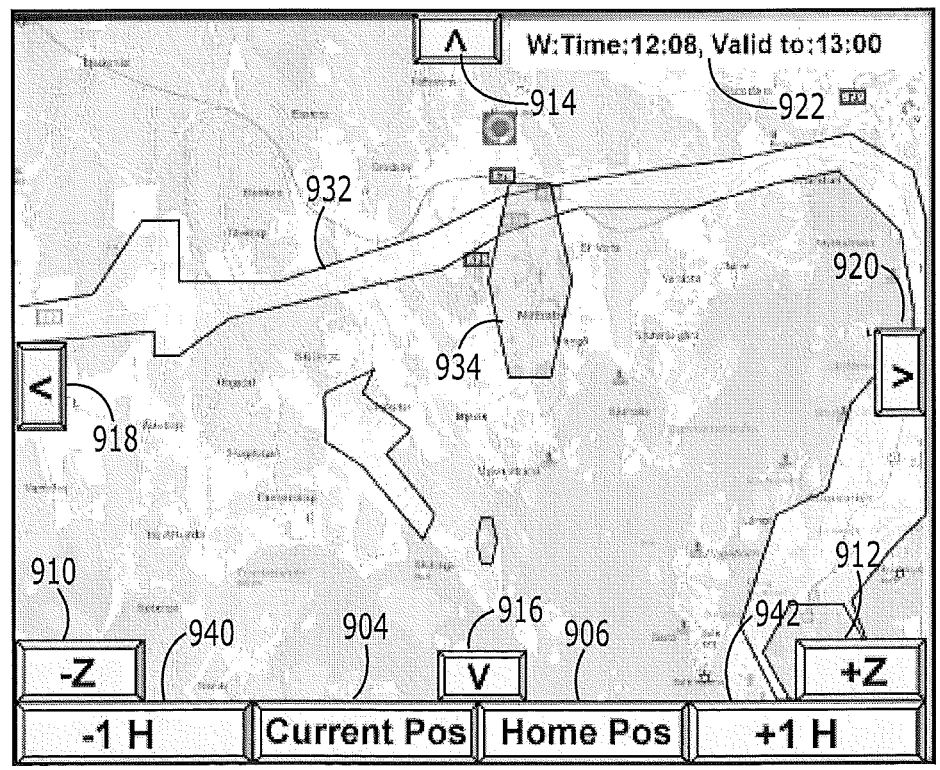
Figure 20:
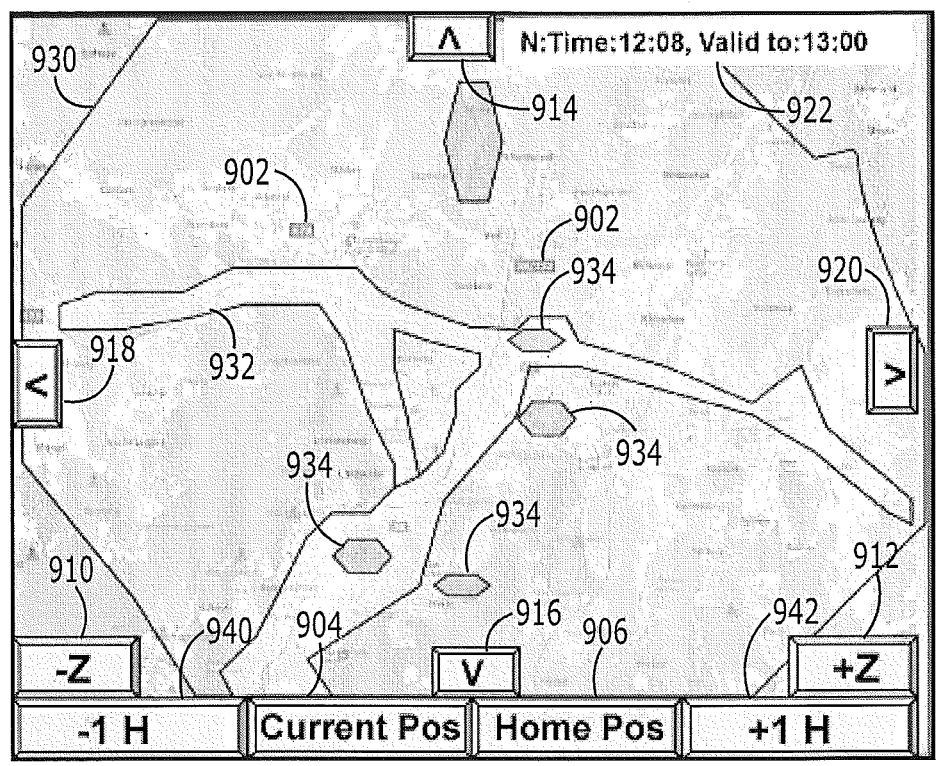
Figure 21:
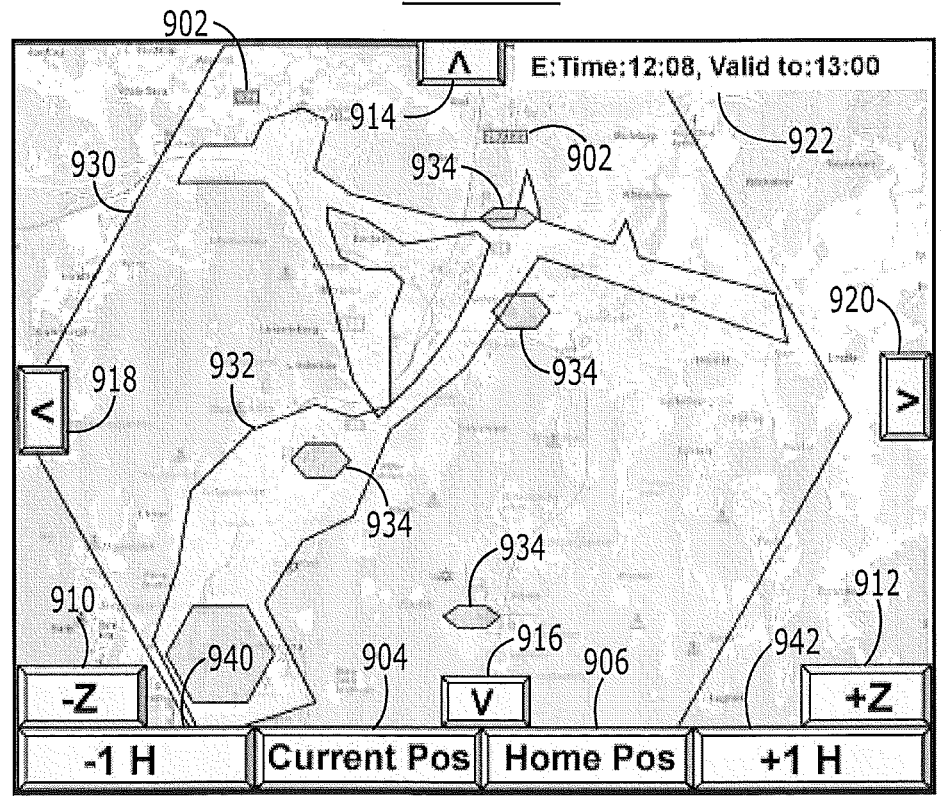

FIG. 17 illustrates other embodiments wherein the current location is shown at the center of the display by 902 and the user's home location is shown by circle 950.

FIGS. 18-21 illustrate panning of the map upon activation of the down or south button (916), left or west button (918), up or north button (914) and right or east button (920).

Figure 22:
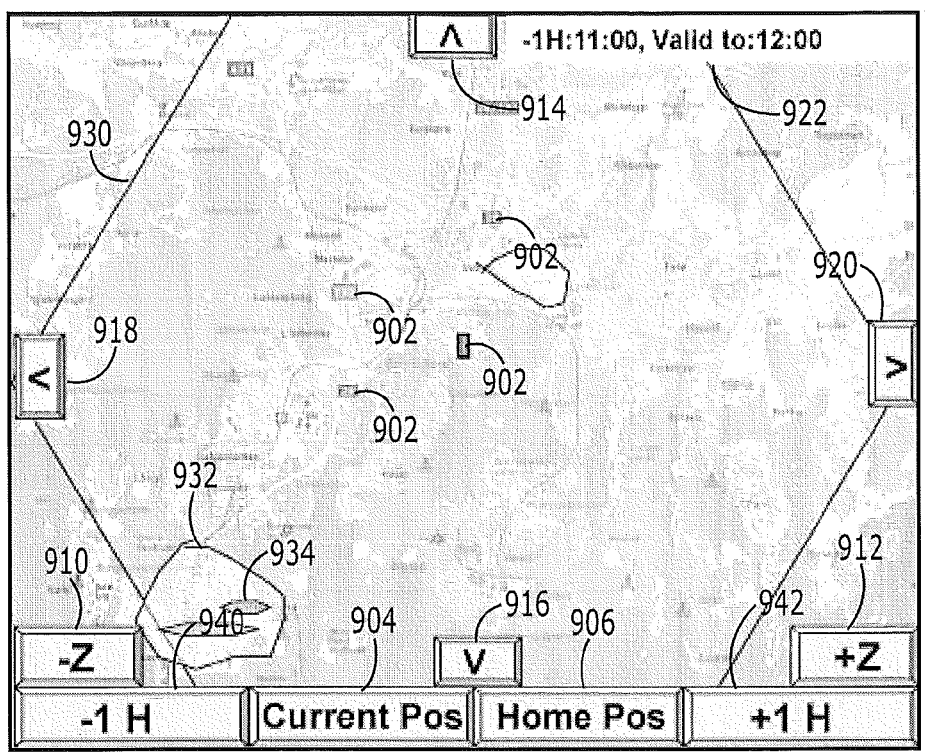
Figure 23:
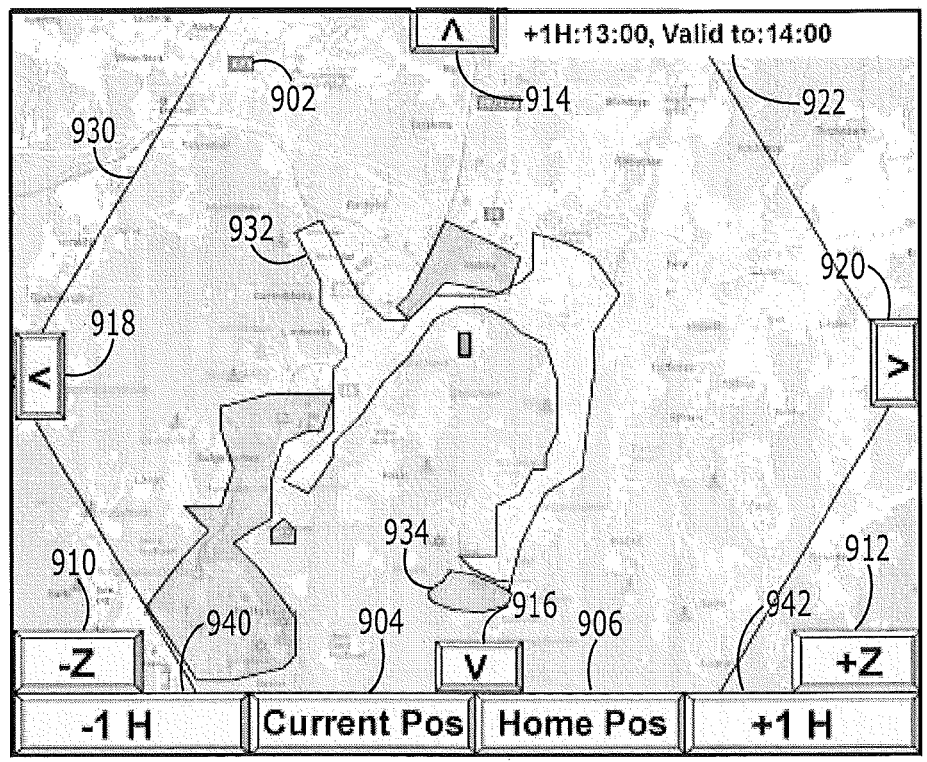

FIG. 22 illustrates an indication of past discounts upon activation of the "−1H" button 940, and FIG. 23 illustrates a discount for the next hour upon activation of the "+1H" button 942.

Figure 24:
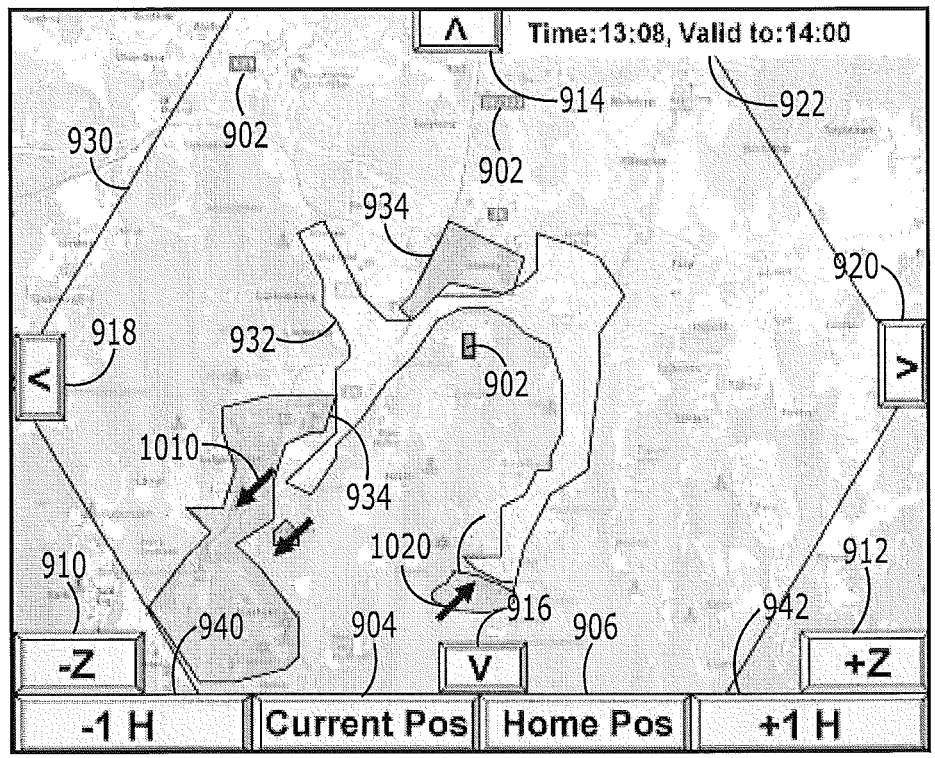

FIG. 24 adds trends to the display of FIG. 23 by adding up and down arrows 1020 and 1010, respectively.

Figure 25:
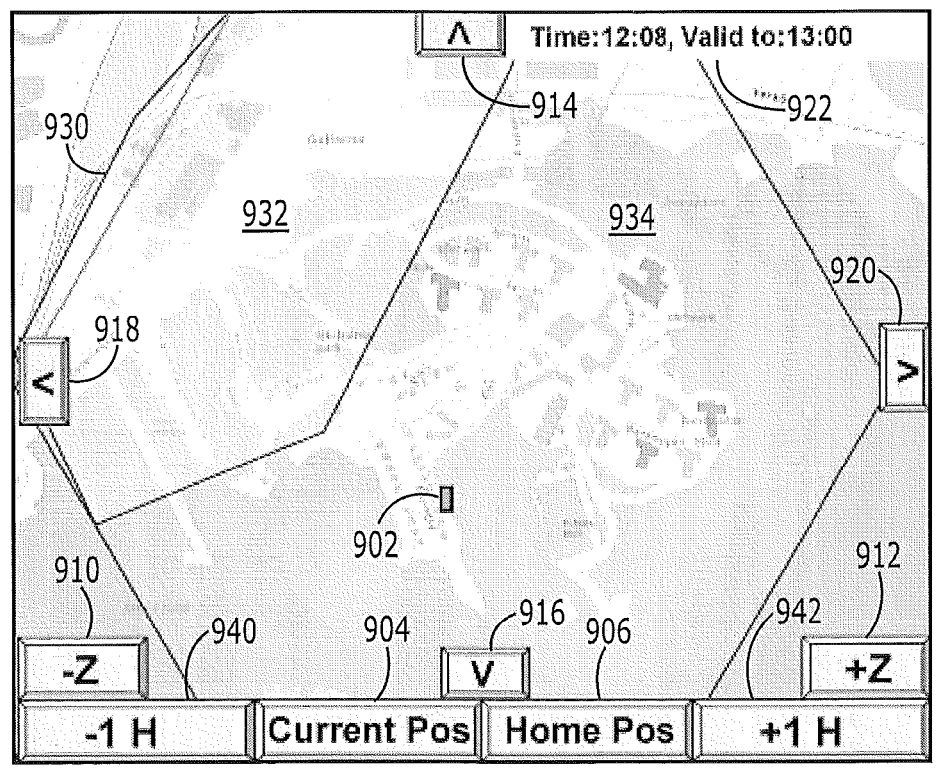
Figure 26:
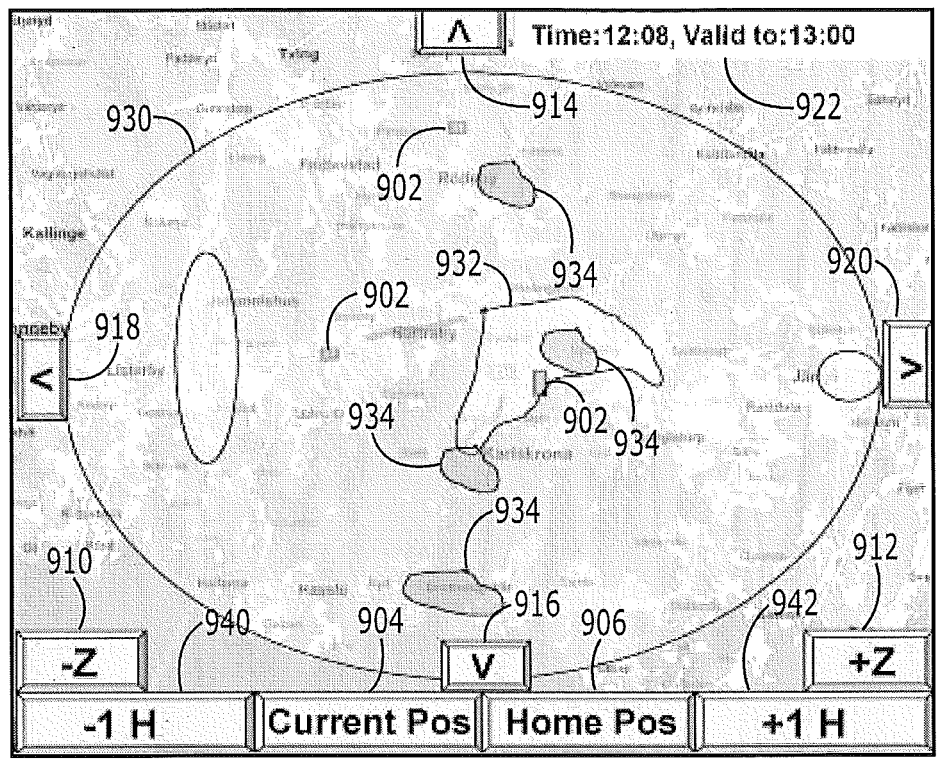

FIG. 25 illustrates zooming in upon activation of the "+Z" button 912, and FIG. 26 illustrates zooming out upon activation of the "−Z" button 910.

Figure 27:
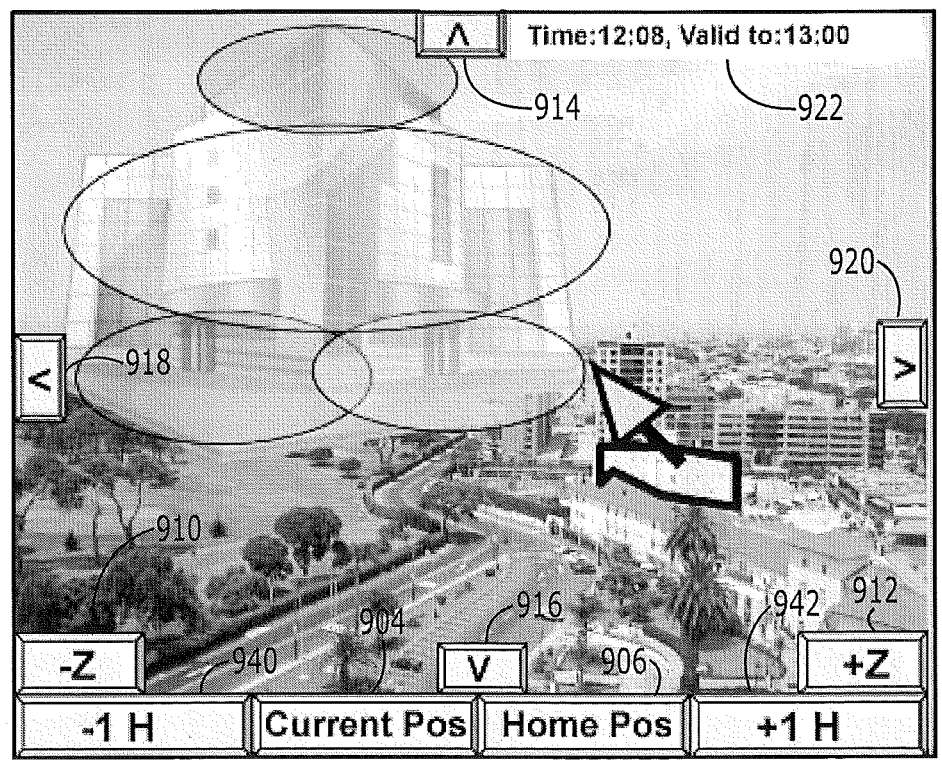

Upon the widespread use of three-dimensional (3D) displays, various 3D embodiments of these and/or other displays may also be provided according to various embodiments described herein, as conceptually illustrated in FIG. 27.

Figure 28:
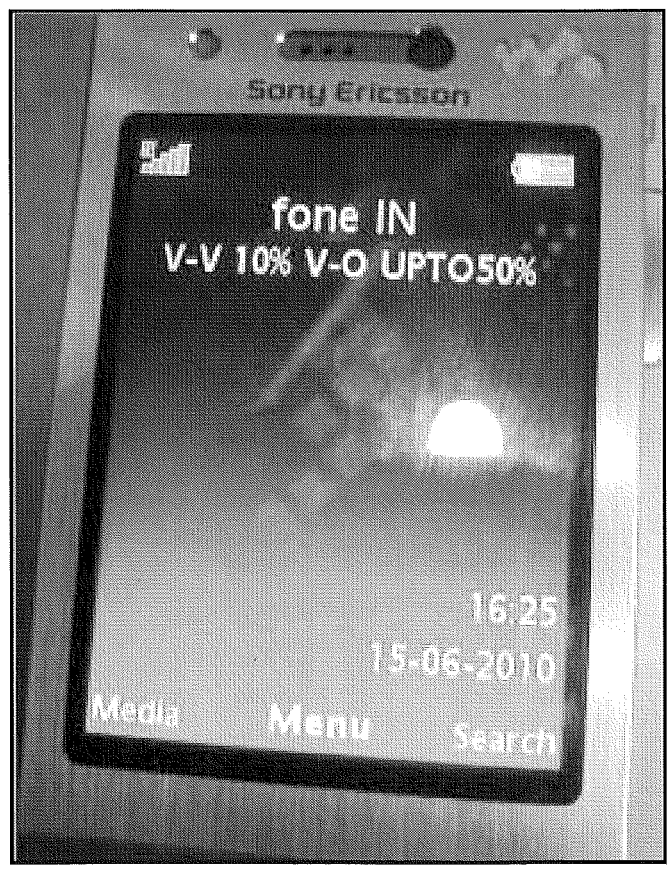
FIG. 28 illustrates a conventional display that has been used to provide present rate discount information.

Finally, FIG. 28 illustrates a conventional indication of a present discount that applies to a wireless user terminal, such as may be provided in 2G and some 3G networks. The discount is displayed on a second line, below the network operator name. The discount may also be presented at any other location on the display.

Accordingly, since rates and discounts may be differentiated based on location and time as provided by various embodiments described herein, end users can proactively decide when and where to communicate. This can benefit both the network operator and the end users.

Various embodiments were described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Various embodiments described herein can operate in any of the following Radio Access Technologies: Advanced Mobile Phone Service (AMPS), ANSI-136, Global Standard for Mobile (GSM) communication, General Packet Radio Service (GPRS), enhanced data rates for GSM evolution (EDGE), DCS, PDC, PCS, code division multiple access (CDMA), wideband-CDMA, CDMA2000, Universal Mobile Telecommunications System (UMTS), 3GPP LTE ($3^{rd}$ Generation Partnership Project Long Term Evolution) and/or 3GPP LTE-A (LTE Advanced). For example, GSM operation can include reception/transmission in frequency ranges of about 824 MHz to about 849 MHz and about 869 MHz to about 894 MHz. EGSM operation can include reception/transmission in frequency ranges of about 880 MHz to about 914 MHz and about 925 MHz to about 960 MHz. DCS operation can include transmission/reception in frequency ranges of about 1410 MHz to about 1785 MHz and about 1805 MHz to about 1880 MHz. PDC operation can include transmission in frequency ranges of about 893 MHz to about 953 MHz and about 810 MHz to about 885 MHz. PCS operation can include transmission/reception in frequency ranges of about 1850 MHz to about 1910 MHz and about 1930 MHz to about 1990 MHz. 3GPP LTE operation can include transmission/reception in frequency ranges of about 1920 MHz to about 1980 MHz and about 2110 MHz to about 2170 MHz. Other Radio Access Technologies and/or frequency bands can also be used in embodiments according to the invention.

For purposes of illustration and explanation only, various embodiments of the present invention were described herein in the context of wireless user terminals that are configured to carry out cellular communications (e.g., cellular voice and/or data communications). It will be understood, however, that the present invention is not limited to such embodiments and may be embodied generally in any wireless communication terminal that is configured to transmit and receive according to one or more radio access technologies.

As used herein, the term "wireless user terminal" includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone (s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. As used herein, the term "wireless user terminal" also includes any other radiating user device that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Finally, the term "node" includes any fixed, portable and/or transportable device that is configured to communicate with one or more user equipment and a core network, and includes, for example, terrestrial cellular base stations (including microcell, picocell, wireless access point and/or ad hoc communications access points) and satellites, that may be located terrestrially and/or that have a trajectory above the earth at any altitude.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, if used herein, the common abbreviation "e.g.", which derives from the Latin phrase exempli gratia, may be used to introduce or specify a general example or examples of a previously mentioned item, and is not intended to be limiting of such item. If used herein, the common abbreviation "i.e.", which derives from the Latin phrase id est, may be used to specify a particular item from a more general recitation.

Exemplary embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit such as a digital processor, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A wireless user terminal comprising:
   a transceiver that is configured to communicate with a wireless network;
   a user interface comprising a display; and
   a processor that is configured to simultaneously provide to the user interface a forecast of a future rate discount at the present location for future communications over two or more time periods with the wireless network,
   the forecast of the future rate discount comprising a map that is displayed on the display and that includes thereon an indication of a present location of the wireless user terminal, and
   the display further comprising a graph simultaneously indicating the rate discount over the two or more time periods at the present location of the wireless user terminal.

2. A wireless user terminal according to claim 1 wherein the forecast of a future rate discount comprises an indication of a specific future time and a specific future rate discount that will apply at the future time and/or an indication of a rate discount at a possible future location that is geographically spaced apart from a present location of the wireless user terminal.

3. A wireless user terminal according to claim 1, wherein the rate discount will apply at a future time.

4. A wireless user terminal according to claim 1, wherein a geographic region in which the future rate discount will apply is included on the map and is geographically spaced apart from the present location of the wireless user terminal.

5. A wireless user terminal according to claim 1,
wherein a geographic region in which the future rate discount will apply is included on the map and is geographically spaced apart from the present location of the wireless user terminal and in which a rate discount applies, and
wherein the map includes an indication of a future time at which the rate discount will apply.

6. A wireless user terminal according to claim 1 wherein the forecast of a future rate discount comprises an indication of a rate discount at a possible future location that is geographically spaced apart from a present location of the wireless user terminal and an indication of a specific future time at which the wireless user terminal is expected to reach the future location at which the rate discount will apply.

7. A wireless user terminal according to claim 1 wherein the forecast of a future rate discount comprises indications of rate discounts at a plurality of directions in which the wireless user terminal can move.

8. A wireless user terminal according to claim 1 wherein the forecast of a future rate discount comprises indications of rate discounts at a plurality of future times at a present location of the wireless user terminal.

9. A wireless user terminal according to claim 1 wherein the processor is configured to provide to the user interface the forecast of a future rate discount for future communications with the wireless network in response to receipt of a request from the user interface, in response to receipt of a message from the wireless network and/or automatically at a given time.

10. A wireless user terminal according to claim 9 wherein the processor is further configured to send a message to the wireless network over the transceiver in response to the receipt of the request from the user interface and/or to receive the message from the wireless network over the transceiver, using unstructured supplementary service data, short message service and/or hypertext transfer protocol.

11. A wireless user terminal according to claim 1 wherein the processor is further configured to adjust operation of the transceiver in response to the forecast of a future rate discount for future communications with the wireless network that is provided to the user interface, and in further response to receipt of a user command at the user interface.

12. A wireless user terminal according to claim 1 wherein the future rate discount for future communications with the wireless network is different from a present rate discount for a present communication with the wireless network.

13. A server for a wireless network, the server comprising:
a processor that is configured to simultaneously provide to the wireless network, a forecast of a future rate discount over two or more time periods at the present location of a wireless user terminal for future communications by the wireless user terminal with the wireless network,
the forecast of the future rate discount comprising a map for display on the wireless user terminal and includes an indication of a present location of the wireless user terminal, and
the map for display on the wireless user terminal further comprising a graph simultaneously indicating the rate discount over the two or more time periods at the present location of the wireless user terminal.

14. A server according to claim 13 wherein the forecast of a future rate discount comprises an indication of a specific future time and a specific future rate discount that will apply at the future time and/or an indication of a rate discount at a possible future location that is geographically spaced apart from a present location of the wireless user terminal.

15. A server according to claim 13 wherein the forecast of a future rate discount comprises textual, graphical, audible, animation and/or geo-location data that provides the forecast of a future rate discount.

16. A server according to claim 13 wherein the processor is configured to provide to the wireless network, the forecast of a future rate discount for future communications by the wireless user terminal with the wireless network, in response to receipt of a request from the wireless user terminal and/or automatically at a given time.

17. A wireless communication method, comprising:
receiving from a wireless user terminal, a request for a forecast of a future rate discount for future communications between the wireless user terminal and a wireless network;
obtaining a time and a present location of the wireless user terminal in response to the request that was received;
determining simultaneously the forecast of a future rate discount over two or more time periods at the present location of the wireless user terminal for future communications between the wireless user terminal and the wireless network, based upon the time and the present location of the wireless user terminal that were obtained; and
providing to the wireless network, an indication of the forecast of a future rate discount for future communications between the wireless user terminal and the wireless network that was determined.
wherein the forecast of the future rate discount comprises a map for display on the wireless user terminal and includes an indication of a present location of the wireless user terminal, and
wherein the map for display on the wireless user terminal further comprises a graph simultaneously indicating the rate discount over the two or more time periods at the present location of the wireless user terminal.

18. A method according to claim 17 wherein the indication of the forecast of a future rate discount comprises an indication of a specific future time and a specific future rate discount that will apply at the future time and/or an indication of a rate discount at a possible future location that is geographically spaced apart from the present location of the wireless user terminal.

19. A method according to claim 17 wherein the indication of the forecast of a future rate discount comprises textual, graphical, audible, animation and/or geo-location data.

20. A method according to claim 17 wherein obtaining a time and a present location of the wireless user terminal in response to the request that was received comprises:
obtaining a current time if a time was not received with the request; and
determining the present location of the wireless user terminal if the present location of the wireless user terminal was not received with the request.

* * * * *